May 11, 1926.
A. C. ULRICH
1,584,049
AUTOMOBILE SIGNAL MECHANISM
Filed July 14, 1924
2 Sheets-Sheet 1
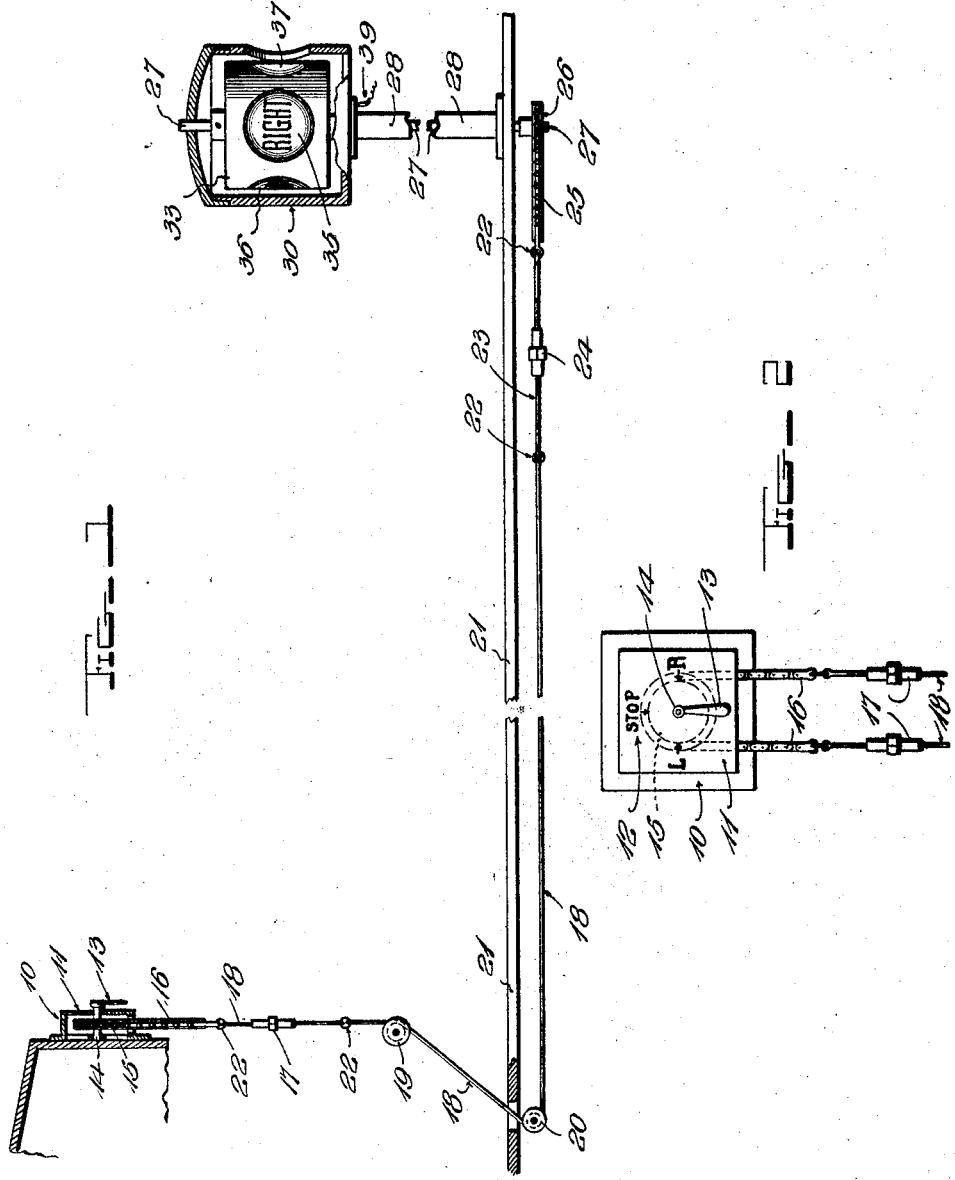
INVENTOR.
Alfred C. Ulrich
BY
James Hamilton
ATTORNEY

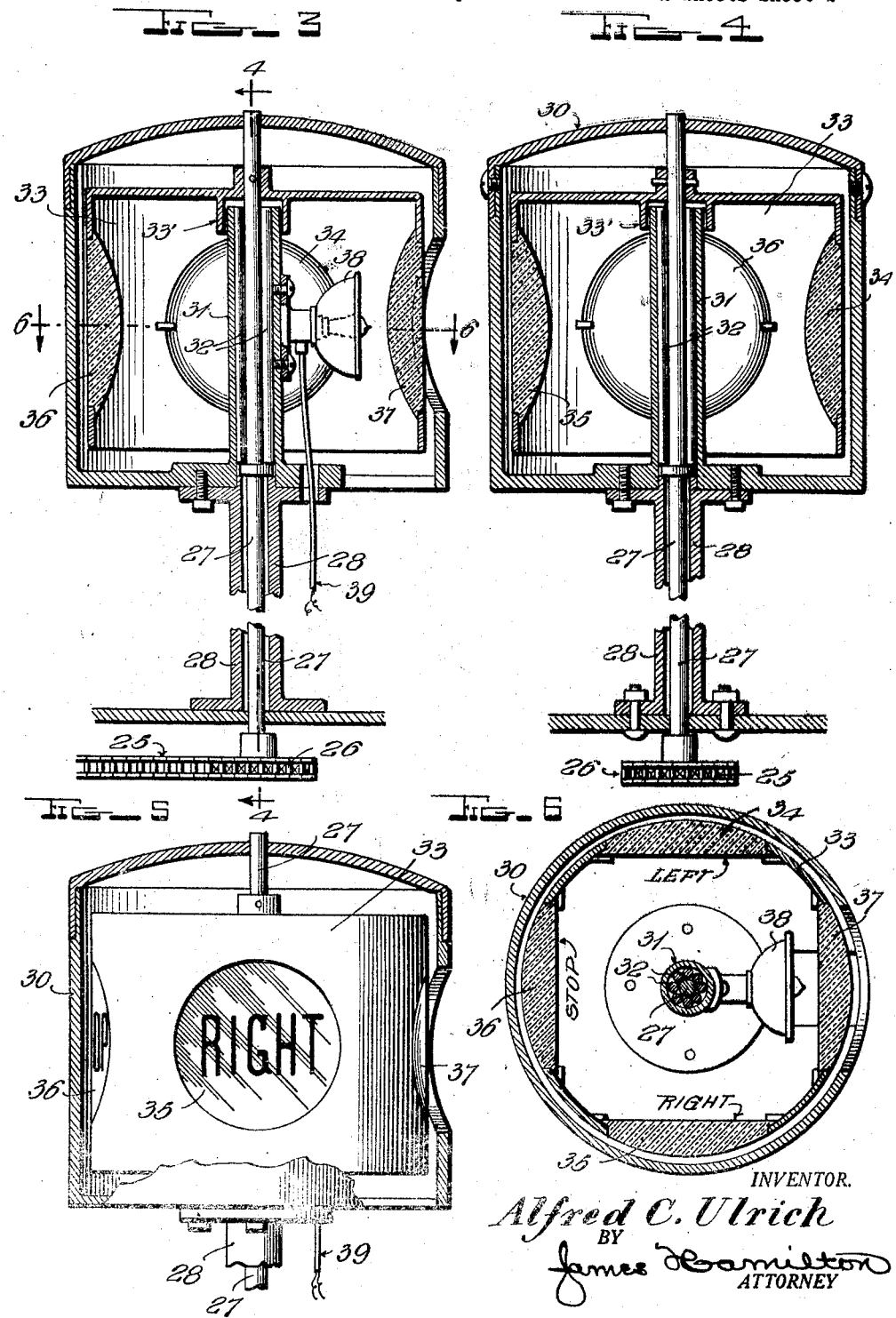

Patented May 11, 1926.

1,584,049

UNITED STATES PATENT OFFICE.

ALFRED C. ULRICH, OF HORICON, WISCONSIN.

AUTOMOBILE SIGNAL MECHANISM.

Application filed July 14, 1924. Serial No. 725,850.

This invention relates to improvements in automobile signal mechanism and particularly to improvements in signal mechanism operable by the driver of the car and arranged to give drivers of other cars on the same highway warning of his intention to stop or to turn; and an object of this invention is to provide a signal mechanism of the character set forth which will be simple in construction, comparatively cheap in manufacture, low in cost of first installation and of repair, and efficient and durable in operation and use. In the embodiment of this invention hereinafter described, the signals are illuminated, so that the signals are visible at times when signals given by hand may be seen not at all or at best uncertainly.

In the drawings illustrating the principle of this invention and the best mode now known to me of applying that principle, Fig. 1 is an elevation of the signal mechanism, parts of the automobile being shown merely conventionally; Fig. 2 is a detail of the driver's indicator; Fig. 3 is a vertical section through the rear signal-light; Fig. 4 is a section on the line 4—4, of Fig. 3; Fig. 5 is an elevation of the signal-turret; and Fig. 6 is a section on the line 6—6, of Fig. 3.

In front of the chauffeur's seat and upon any suitable part of the automobile (for example, upon the dashboard and preferably to the left of the main-shaft of the steering-mechanism), there is mounted the driver's signal-box 10 the face 11 of which that is opposed to the driver is marked so as to form a sort of a dial 12 that includes the letters L and R and the word Stop; but other indicia may be used, if found desirable. Over this dial 12 travels an indicator-handle 13, which is adapted and designed to be manipulated by the driver of the car. Within the signal-box 10, there is arranged a shaft 14, one end of which projects outside of the box 10 and carries the handle 13. Mounted fast upon the shaft 14 and within the box 10, there is a sprocket-wheel 15, so that, by turning the handle 13, the sprocket-wheel 15 is rotated. Over the sprocket-wheel 15, there is passed a sprocket-chain 16, to each end of which there is attached a turnbuckle 17; and to the lower end of each turnbuckle 17 there is suitably fastened a wire 18 or like flexible power-transmitting member. By means of the turn-buckles 17, suitable tautness may be imparted to the wires 18. The wires 18 pass downwardly over suitable pulleys (e. g., double-pulleys) 19, 20, of which the pulleys 20 lie below the floor 21 of the automobile. These pulleys permit the direction of the wires 18 to be changed; and the latter extend towards the rear of the car, where the rear end of each of them is suitably connected (as through an eye or ring 22) with a slender rod 23 provided with a turnbuckle 24 and having its rear end suitably fastened to an end of a sprocket-chain 25 that meshes with and drives a sprocket-wheel 26, which is horizontally disposed and is mounted fast upon the lower end of a vertical shaft 27, which is arranged to rotate within a hollow post 28 the lower end of which is fastened to the rear part 29 of the car and outside of the body of the same. Upon the upper end of the hollow post 28, there is arranged a rear signal-box 30, which, like the hollow post 28, is stationary and the rear of which is open so as to permit the signals given by the driver to be seen by the driver of the car that is following. The rear signal-box 30 carries at its center a bearing 31 for the upright shaft 27, and this bearing 31 is provided with rollers 32 (that is, it is a roller-bearing). Mounted within the rear signal-box 30 and fastened to the upper end of the upright shaft 27, there is a rotary inverted-cuplike signal-carrying member 33, which is called by me a signal-turret. From the top of this signal-turret 33, there projects inwardly a socket 33' into which fits the upper end of the shaft-bearing 31. Each of the four sides of this signal-turret 33 is provided with a glass-window, which may be suitably colored and is suitably inscribed. For example, the window 34 may be marked Left and the window 35 directly opposite may be marked Right; and these two windows may be of yellow-colored glass so as to indicate caution to the pursuing driver. The third window 36 may be marked Stop and the fourth window 37 may bear the word Go; to indicate danger as well as to advise the following driver of the intention to slow down or come to a halt, the window 36 (marked Stop) may be made of red-colored glass. The fourth window 37 may be made of greenish-colored glass, so as to indicate a clear road ahead to the uncoming driver; but clear glass (that is, uncolored glass) may be used for this or any of the four windows. Upon the bearing 31, there is suitably mounted an electric lamp 38, which may be fed through the lead-wires 39 from the lamp-circuit or battery of the automobile. The electric lamp 38 is so placed that the rays of light from it are directed rearwardly and pass through that one of the windows 34, 35, 36, 37, of the signal turret 33 that may be, at the instant, interposed in their path, whereby the marking on the window is brought out sharply by the illumination thereof and the color of the glass becomes visible to the driver of the car in rear. Not only may the window 37 be made of clear glass (that is, uncolored glass) but it may be left without any marking upon it; or it may be made of red unmarked glass, if it be so desired. So that the light from the electric lamp 38 may be permitted to illuminate the license-plate of the automobile, a slit 40 is made in the bottom of the rear signal-box 30.

In the operation of the signal arrangement hereinbefore described, the driver, by adjusting the turnbuckles 17, 24, brings the connecting wires 18 to a suitable degree of tautness and takes up any undue amount of slack so that there may be as little lost motion as practicable. When the sprocket-wheel 15 is turned through a given arc, as a quarter turn, for example, the sprocket-wheel 26 is turned through the same arc. So, when the driver desires to signal to the drivers of the following cars that it is his intention to stop, he throws the indicator-handle 13 through an arc of one hundred and eighty degrees (180°), that is, from its position shown in Fig. 2 until its free end is brought over the marking Stop on the dial 12 in front of him. He thus rotates the shaft 14 and the sprocket-wheel 15 through a half-turn; and this rotatory motion is communicated or transmitted through the connecting wires 18 and the sprocket chains 16, 25, to the sprocket wheel 26, which is likewise moved through a half-turn and rocks the turret-carrying shaft 27 through an equal angular displacement. In this way, the signal-turret 33 is thrown half way around, so that the positions of the windows 36, 37, are changed, one for the other, and the rays of light from the lamp 38 now pass through the window 36, which is illuminated so that the signal Stop becomes visible to the drivers of the pursuing cars. In an entirely similar way, by throwing the indicator-handle 13 through the quadrant of a circle, the driver may signal that he intends to turn to the right (or to the left), bringing the window 35 (or the window 34) into the path of the rays from the lamp 38 for illumination thereby.

In accordance with the patent statutes, I have shown and described the preferred form of this invention herein; I desire it to be distinctly understood that I fully realize that changes may be made in the structure herein disclosed and that I intend to include within the scope of the claims that follow hereinafter all modifications of the preferred form of this invention that do not depart substantially from the spirit thereof.

I claim:

1. A device of the class described including a stationary casing having an opening in one side, a tubular support within the casing and attached thereto, a shaft extending through the tubular support and held from movement longitudinally thereof, a light diffusing medium attached to said tubular support in position to direct its rays through the opening of the casing, a turret device connected to rotate with said shaft, and windows that are carried by the turret device and that are brought successively by the turning thereof and of the shaft into the path of the rays from the light diffusing medium to permit the passage of the rays from the casing through the windows.

2. A device of the class described including a stationary casing having an opening in one side and in its bottom, a tubular support within the casing and attached thereto, a shaft extending through the tubular support and held from movement longitudinally thereof, means for rotating said shaft, a light diffusing medium attached to said tubular support in position to direct its rays through the openings of the casing, a turret device connected to rotate with said shaft, and windows that are carried by the turret device and that are brought successively by the turning thereof and of the shaft into the path of the rays from the light diffusing medium to permit the passage of the rays from the casing through the windows.

3. A device of the class described including a stationary casing having an opening in one side and in its bottom, a tubular support within the casing and attached thereto, a shaft extending through the tubular support and held from movement longitudinally thereof, a light diffusing medium attached to said tubular support in position to direct its rays through the opening of the casing, a turret device connected to rotate with said shaft, and windows that are carried by the turret device and that are brought successively by the turning thereof and of the shaft into the path of the rays from the light diffusing medium to permit the passage of the rays from the casing through the windows.

Signed at Horicon, in the county of Dodge and State of Wisconsin, this fourteenth day of April, 1924.

ALFRED C. ULRICH.